United States Patent Office 3,575,785
Patented Apr. 20, 1971

3,575,785
PREFORMED ARCHITECTURAL SURFACE
COVERING COMPOSITION
Robert J. McManimie, Des Peres, and Ross M. Hedrick, St. Louis, Mo., assignors to Monsanto Company, St. Louis, Mo.
No Drawing. Continuation-in-part of abandoned application Ser. No. 518,019, Jan. 3, 1966. This application Jan. 21, 1969, Ser. No. 792,759
The portion of the term of the patent subsequent to June 6, 1984, has been disclaimed and dedicated to the Public
Int. Cl. B32b 5/16, 19/02; C08f 45/04
U.S. Cl. 161—162                                  28 Claims

ABSTRACT OF THE DISCLOSURE

An architectural surface composite, such as a flooring composite, comprising an architectural surface and a preformed resinous covering composition, said composition comprising an inorganic filler and a polyalkyl methacrylate. Also disclosed is a process for covering an architectural surface, such as a floor or wall, with the above-described covering composition.

CROSS REFERENCE TO RELATED APPLICATION

This application is a continuation-in-part of an earlier copending U.S. appplication, Ser. No. 518,019, filed Jan. 3, 1966 now abandoned.

FIELD OF THE INVENTION

The present invention relates to coverings for architectural surfaces such as floors, walls and the like. A principal feature of the invention relates to preformed floor covering compositions containing a polyalkyl methacrylate matrix and an inorganic filler. Another feature relates to a process for covering architectural surfaces such as floors and walls using the preformed resinous compositions described above.

One hundred years ago, terrazzo was a flooring material installed in place of wood in locations where good wearing characteristics, distinctive design, permanence and durability were more important than initial cost. In recent years, a wide variety of resinous floor coverings such as solid vinyl and vinyl asbestos tile, linoleum tile, rubber tile, cork tile, etc. has provided users with a large number of distinctive designs and with many improved wearing characteristics by comparison to wood flooring. The use of terrazzo continues to grow, however, because of the dissimilarity in performance characteristics between terrazzo flooring and the various resinous floor tiles. Generally, when the coupling of distinctive design with the structural permanence of wood is desired, a vinyl or vinyl asbestos or similar resinous floor tile is employed. When a superior combination of permanence, durability and good wearing characteristics is desired, terrazzo is used. The two sectors of the flooring market are further separated by price considerations. Terrazzo is considerably more expensive than a synthetic resinous covering over a wooden or concrete substrate. It is an object of the present invention to provide a resinous floor covering designed to compete with terrazzo in those markets requiring a high level of performance and permanence. It is a further object to provide a terrazzo-like flooring capable of accepting a wide variety of styles and designs. It is yet another object to provide a terrazzo-like flooring that can be installed using techniques similar to techniques for installing vinyl tile.

Those skilled in the art will recognize that a material satisfying all the above objects could also be used as a covering for vertical architectural surfaces such as walls, room dividers, other partitions, etc. The material would then compete with ceramic tile, wood and aluminum siding, etc. on a cost-performance basis. It is therefore an additional object of this invention to provide a wall covering designed to compete with currently available, hard-surfaced coverings such as ceramic tile. Other objects, benefits and advantages will become apparent in view of the following detailed description.

SUMMARY OF THE INVENTION

The architectural surface composites included within the scope of the present invention comprise an architectural surface and a preformed resinous covering composition, said composition comprising (a) from about 10 to about 95% by volume based on the total composition of an inorganic filler having a Mohs hardness of at least about 4, and
(b) from about 90 to about 5% by volume based on the total composition of a polyalkyl methacrylate.

The process of the present invention comprises adhering to an architectural surface the preformed resinous covering composition described above.

DESCRIPTION OF THE PREFERRED
EMBODIMENTS

The term *architectural surface* refers to the various horizontal, vertical and diagonal exterior and interior surfaces of a building which can exist in the form of walls, ceilings, floors, room dividers, doors and the like. The architectural surface of the composite can be of any solid, cohesive, rigid material such as wood, slate, concrete or terrazzo. In addition, the surface can be covered with a variety of materials such as linoleum, paint or old vinyl tiles prior to the application of the covering compositions of this invention.

Preformed resinous coverings as used herein refer to solid materials having a definite discrete shape in sheet form such as floor tile. This is in contrast to materials in liquid form or in a flowable state which can be applied to a floor or other surface and which form a covering upon solidification or drying such as a floor wax composition. Although floor tile represents one popular and readily recognizable form of a preformed resinous floor covering useful herein, applicants' invention is not limited to flooring composites using floor tile since one form in which their invention is particularly suitable is as large sections much larger than conventional tile. Floor tile customarily has a thickness of about $1/16$ to about $3/16$ inch, and a length and width from about 8 or 9 to about 12 or 14 inches. In addition to such suitable sizes, the compositions used herein can vary in thickness from $1/32$ inch or less up to one inch or more. Thick sheet of $1/2$ or more inch in thickness, is often fabricated by laminating two or more thinner sheets together. Length and width dimensions can also be both smaller and larger than the customary floor tile dimensions. Certain uses can be satisfied by composition shapes as small as one inch squares or less, such as are utilized for small ceramic tiles. Other shapes can have lengths and widths of six feet or more. Suitably sized shapes include those about 36 by 36 inches, 48 by 48 inches, 24 by 48 inches, and other similar dimensions.

It is sometimes desirable to provide a backing of some kind for the surface coverings of the present invention in order to improve adhesion of the covering to the substrate. The backing can be bonded to the covering composition with a suitable adhesive or pressed directly into the composition during the molding procedure. Preferred backing materials include burlap and canvas.

When the surface coverings are very rigid, i.e. a flexural modulus of 1,000,000 p.s.i. or more, and are to be affixed to an equally or more rigid substrate such as a concrete floor, problems arise if both the covering and the substrate are not perfectly flat. The coverings can only be adhesive bound to the substrate with difficulty and the edges of the tiles will not remain flush with one another for prolonged periods of time. The above difficulties can be overcome by grinding the substrate flat or by applying the covering to the substrate, allowing the tiles to set into their final position, and grinding them to form a flat surface. Alternatively, the surface coverings can be fabricated into tile of relatively low flexural modulus, i.e. 500,000 p.s.i., so that they will conform to the contour of the substrate.

The alkyl methacrylates useful in the above compositions include alkyl methacrylate homopolymers, copolymers, interpolymers and mixtures thereof. Suitable polymers include polymers formed by the polymerization of methyl methacrylate, ethyl methacrylate, n-propyl methacrylate, isopropyl methacrylate, and the isomeric butyl methacrylates. Preferred copolymers are prepared by the copolymerization of methyl methacrylate with one or more alkyl acrylates or alkyl methacrylates, e.g., ethyl acrylate, propyl acrylate, 2-ethylhexyl acrylate, butyl methacrylate, lauryl methacrylate and stearyl methacrylate. Polymeric network structures, in distinction to the generally linear structures, are obtained by the copolymerization of methyl methacrylate with polyfunctional methacrylates such as ethylene glycol dimethacrylate, propylene glycol dimethacrylate, butylene glycol dimethacrylate, polyethylene glycol dimethacrylate and trimethylolpropane. Thus, the term "alkyl methacrylate polymer" is intended to include alkyl methacrylate homopolymers and alkyl methacrylate copolymers and interpolymers of alkyl methacrylate with other alkyl methacrylates and/or alkyl acrylates. Alkyl methacrylate polymers also encompass the copolymers and interpolymers of an alkyl methacrylate with styrene, the ring-substituted methyl styrenes, biallyl, acrylonitrile, methacrylonitrile, 2-hydroxyalkyl methacrylates, vinyl chloride, maleic anhydride and other similar ethylenically unsaturated monomers polymerizable by free radical addition or anionic polymerization, preferably where the alkyl methacrylate comprises at least 50%, and more preferably at least 75 or 80%, of the interpolymer or polymeric blend. One particularly useful blend or copolymer is one where the resinous matrix of the filled composition contains from about 5 to about 40% by weight polyvinyl chloride and about 95 to about 60% by weight polyalkyl methacrylate.

The alkyl methacrylate polymers useful in the preparation of these novel compositions can be linear or crosslinked. Crosslinking provides some improvement in physical properties, particularly impact strength, but the linear polymers are also definitely included within the scope of this invention. The maximum amount of tolerable crosslinking in the polymer depends upon the proposed use of the finished composition. Increased crosslinking produces compositions with high heat distortion temperatures and somewhat diminished flexural strength and impact strength. Consequently, control of crosslinking provides a variable which enables one to tailor the polymer to produce a composition of the desired properties. A suitable amount of crosslinking is that which will provide a polymer with an effective molecular weight around 20,000 or more, preferably 30,000 or more. Therefore a linear alkyl methacrylate polymer with a molecular weight around 20,000 or more need not be crosslinked whereas a lower molecular weight polymer, e.g. a polymer with a molecular weight of 5,000 or less, would be better utilized in the practice of this invention if it were crosslinked to provide a composition wherein the polymeric constituent has an effective molecular weight around 20,000 or more. Suitable crosslinking agents are well known in the art and can be used here in the conventional manner. Crosslinking can also be achieved through a coupling agent, subsequently described in detail hereinbelow. Suitable crosslinking monomers include ethylene glycol dimethacrylate, polyethylene glycol dimethacrylate, propylene glycol dimethacrylate, butylene glycol dimethacrylate, trimethylolpropane trimethacrylate, divinyl benzene and diallyl.

The compositions of this invention can be modified by the addition of a rubbery polymer. The rubbery polymer component of the reinforced compositions is preferably used in a quantity ranging up to about 15%, more preferably from about 1% to about 10%, by weight of the alkyl methacrylate polymer. Higher rubber contents are of course included within the scope of this invention, especially if the rubber selected is a partially degraded, low molecular weight rubber of low viscosity. Reinforced polyalkyl methacrylates having up to about 10% dispersed rubber based on the alkyl methacrylate can be readily prepared using techniques described in the subsequent examples. Handling difficulties are experienced when the rubber content is increased beyond 10 or 11%. Other techniques such as a pressurized injection into the mold are of course available and permit the polymerization of cast shapes of reinforced polyalkyl methacrylates having 20% or more dispersed rubber. The present invention is limited in its preferred aspects, however, to compositions having a maximum of about 15% by weight dispersed rubber based on the alkyl methacrylate. This is because of the substantially reduced flexural properties achieved at higher rubber concentrations. A maximum rubber concentration of 10% is particularly preferred because of the ease of casting and molding combined with the very extensive and satisfactory range of mechanical properties which can be achieved in reinforced methacrylates having from 1 to 10% dispersed rubber. If, however, a covering composition similar to "sheet vinyl" is desired, a large quantity of rubber in the range of 15 or 20 to 25% dispersed rubber may be required to provide a filled alkyl methacrylate composition which can be formed into rolls for shipment to the site of intended use.

For convenience in preparing the reinforced compositions, selection of a rubbery polymer that is soluble in the alkyl methacrylate monomer system is preferred, although other rubbers not completely soluble can be used with some sacrifice in product uniformity. Suitable rubbery polymers include the polybutadiene rubbers, polyisoprene rubbers, styrene/butadiene rubber, natural rubber, acrylonitrile/butadiene rubber, butadiene/vinyl pyridine rubber, butadiene/styrene/vinyl pyridine rubber, polychoroprene, isobutylene/isoprene rubber, ethylene/vinyl acetate rubber, ethylene/propylene rubber and ethylene/propylene/conjugated diene rubber. Preferred are those rubbery polymers named above which contain little or no crosslinked gel.

The rubber must be thoroughly dispersed throughout the reinforced methacrylate composition. To optimize one of the mechanical properties of this invention, namely impact resistance, it is desirable that the rubber be interpolymerized into the methacrylate polymer chain. A simple blend of the polymeric components usually will not yield as satisfactory an impact resistance as will an interpolymer of the rubber and polyalkyl methacrylate. Simple noninterpolymerized reinforced methacrylate-rubber blends are nevertheless useful and even preferred for certain applications where maximum impact strength is not an essential feature. As an example, 1 to 5% of a saturated acrylic rubber, incapable of substantial interpolymerization, is useful in reinforced polyalkyl methacrylate floor and wall coverings. Retardation of settling of particular reinforcement during processing and other advantages are often achieved by use of noninterpolymerized dispersed rubbers.

The inorganic filler materials useful herein have a Mohs hardness of at least 4, preferably at least about 6, and are substantially insoluble in water, i.e. less soluble than 0.25 gram per liter, preferably 0.15 gram per liter. Such materials can be selected from a variety of minerals, metals, metal oxides, metal salts such as metal aluminates and metal silicates and other siliceous materials, heavy metal phosphates, sulfides and sulfates, and mixtures thereof. Generally, those materials which have or can acquire an alkaline surface upon treatment with a base are best suited for the reinforced polymeric compositions of this invention. Since one important feature of this invention is the coupling of the inorganic material to the alkyl methacrylate polymer, metal silicates and certain other siliceous materials which usually have or can readily acquire an alkaline surface are preferred for use herein because of the increased propensity of such materials to participate in the coupling reaction. However, other substances such as alumina, which are coupled to an alkyl methacrylate polymer by the use of higher levels of coupling agents, can be used as reinforcing components either singly or preferably combined with other materials which are more susceptible to coupling, and more preferably combined in minor amounts, i.e. percentages of less than 50% of the total reinforcing material. An example of such a material useful as a reinforcing agent, with which alumina can be mixed, is feldspar, an igneous crystalline mineral containing about 67% $SiO_2$, about 20% $Al_2O_3$, and about 13% alkali metal and alkaline earth metal oxides. Feldspar is one of the preferred reinforcing agents of this invention and a feldspar-alumina mixture is also useful. Other filler materials particularly preferred as reinforcing agents are those materials with an alkaline surface such as wollastonite, which is a calcium metasilicate; crocidolite; and other calcium magnesium silicates. Other useful fillers include quartz and other forms of silica, such as silica gel, glass fibers, cristobalite, etc.; metals such as aluminum, tin, lead, magnesium, calcium, strontium, barium, titanium, zirconium, vanadium, chromium, manganese, iron, cobalt, nickel, copper, and zinc; metal oxides of the foregoing metals; and minerals and mineral salts such as mica, garnet, and hercynite.

The term "inorganic filler material" or simply "inorganic" used in this disclosure refers to materials such as exemplified above. Preferred are those inorganic siliceous materials which have a 3-dimensional crystal structure as opposed to a 2-dimensional or planar crystal configuration. These siliceous materials are also characterized by a somewhat refractory nature with a melting point above about 800° C., a Moh's hardness of at least 4, and a water solubility of less than 0.15 gram per liter. Examples of preferred siliceous materials include minerals such as feldspar, quartz, wollastonite, mullite, kyanite, chrysolite, cristobalite, crocidolite, fibrous aluminum silicate having the formula $Al_2SiO_5$, spodumene and garnet. These minerals are especially desirable for use in reinforced polyalkyl methacrylate compositions for a number of reasons. For instance, they provide a composition with a number of improved properties such as abrasion resistance, flexural strength and modulus, tensile strength and modulus, impact resistance, resistance to heat distortion and resistance to thermal expansion by comparison to compositions using conventional clay fillers and inorganic pigments such as whiting. Further, they provide higher loading levels than can be achieved with glass fibers, or plate-like mica particles, an important economic consideration. In addition, these highly loaded monomer slurries can be directly cast into a final polymerized form, thereby eliminating several processing steps necessary with glass fiber-reinforced compositions. Some inorganic fillers are particularly preferred when special design effects are desired. For instance, garnet is a reddish-brown, very hard inorganic material which contains surface hydroxyl groups, which are useful as described below. Garnet particles having a diameter of one millimeter or more, provide an interesting decorative effect when incorporated into a polyalkyl methacrylate flooring as well as increased abrasion resistance. When coupled to the polymer, the stain resistance and impact strength of the flooring are also increased.

The amount of filler in the surface coverings of this invention can vary over a wide range with the maximum content being limited primarily by the ability of the polymer to bind the inorganic phase into a cohesive mass. Techniques subsequently described herein permit the preparation of surface covering compositions with large aggregates that contain as much as 95% by volume inorganic filler material. A preferred upper limit for the inorganic phase is about 75% by volume of the total composition. The minimum level of filler is limited to that quantity necessary to provide the requisite degree of mechanical properties for the uses envisioned. The uses envisioned require that the finished compositions contain at least 10%, preferably at least 25%, and more preferably for some applications 50%, by volume inorganic filler material.

Filler particle shape and size affect mechanical properties of the finished composition. In a preferred aspect of this invention, the filler is mixed with a monomer or prepolymer and subsequently cast into a mold where the polymer is formed and cured. In such a method, the viscosity of the monomer or prepolymer-filler slurry becomes a limitation on the maximum amount of filler which can be used, i.e. too high a filler concentration produces mixtures too viscous to cast into molds. This limitation on filler concentration imposed by the viscosity is partly dependent upon the shape of the particulate filler. For example, spherical particles do not increase the viscosity of the monomer mixture as much as fibrous materials. By adjusting the particle shape of an inorganic filler and thereby controlling the viscosity of the monomer mixture, it is possible to prepare improved castable or moldable polymeric compositions containing a very large amount of filler.

Another factor which has an effect on the upper limit of filler concentration is the particle size distribution of the filler. A proper distribution of particle sizes provides a composition with a small amount of voids or spaces between the particles, thereby requiring less polymer to fill these spaces and bind the particles together. Proper combination of the two variables of particle shape and size distribution enables one to prepare highly reinforced compositions containing a major proportion of filler.

Particle size distribution is a variable which has an effect on the degree of filler loading possible. Generally particles which pass through a 60 mesh screen are small enough to be used in the compositions of this invention. However, particles as large as 1,000 microns (18 mesh) can be used with equal or nearly equal success, and particles as small as 200 to 400 millimicrons can also be used. More descriptive of suitable particles than limits on particle size is a specification of particle size distribution. A suitable wide particle size distribution is as follows:

100%—250μ or less (60 mesh)
90%—149μ or less (100 mesh)
50%—44μ or less (325 mesh)
10%—5μ or less A narrower distribution also suitable for use in this invention is:

100%—62μ or less (230 mesh)
90%—44μ or less (325 mesh)
50%—11μ or less
10%—8μ or less A relatively coarse mixture useful in this invention has the following particle size distribution:

100%—250μ or less (60 mesh)
90%—149μ or less (100 mesh)
50%—105μ or less (140 mesh)
10%—44μ or less (325 mesh)

A suitable finely divided mixture has the following particle size distribution:

100%—44μ or less (325 mesh)
90%—10μ or less
50%—2μ or less
10%—0.5μ or less

These figures regarding particle size distribution should not be construed as limiting since both wider and narrower ranges of distribution will also be useful as well as both coarser and finer compositions. Rather these figures are intended as representative illustrations of filler materials suitable for use in preparing the reinforced polymeric compositions. As an example of the variety of particle sizes which can be used in the subject reinforced polymeric compositions, large aggregate an inch or more in diameter can also be incorporated into the polymer matrix for special effects. Examples include ground glass, roofing granules, quartz chips, etc.

The fillers perform a dual function in the finished compositions. Depending upon the material selected they may serve as an inexpensive addend to the polymer, thereby lowering the cost of the final product. Secondly, and more importantly, the fillers, when bound to the polymer through a coupling agent, produce compositions with mechanical properties far superior to those of unreinforced polymers.

To achieve the maximum benefits of this invention, namely the production of easily castable or moldable highly reinforced polymeric compositions plus lower costs from higher loadings of inorganic material, it is necessary that the filler be substantially granular in shape rather than fibrous. However, a small amount of fibrous material can be incorporated into a polymer system if the amount of granular or acicular material is reduced by some proportionately larger amount. Alternatively, if pourability is not required, larger amounts of fibrous material can be included in the composition, thereby reinforcing the final product to an even greater extent. The term "granular" as used subsequently in this disclosure refers to particles wherein the smallest and largest dimensions differ by no more than a factor of about 5. The term "acicular" refers to particles having a length to diameter ratio ($l/d$) of from 5 to about 25. The term "fibrous" refers to materials having an $l/d$ ratio greater than about 25. The term "particulate" is used to refer to both granular and acicular particles.

The most common fibrous reinforcing agent used is fibrous glass particles. These fibers are most easily incorporated into the polymeric composition when chopped into strands approximately 0.1 to 3 inches in length, and then either added to a prepolymer-coupler mixture as discrete particles or formed into a mat upon which the prepolymer is poured prior to polymerization. The above methods of incorporation of glass fibers are known in the art and are mentioned here to demonstrate first, that the polymeric compositions of this invention can be reinforced with glass fibers, and secondly that particulately reinforced polymers can be additionally reinforced by incorporation of fibrous materials according to techniques known in the art or according to the procedure described herein as applicable to particulate reinforcing agents.

After optimum particle size distribution of the filler is selected for a particular polymer system, it can be appreciated that an upper limit fo filler can be reached, at which point the composition becomes too viscous to be poured into a mold. The viscosity of monomer-filler slurries can be reduced by surfactants. Lowered viscosity permits the formation of a finer, smoother finish on the final product. Occasionally a finished composition a high filler content, e.g. greater than 70%, may have a granular or coarse texture and may even contain voids or open spaces due to the inability of the viscous mixture to flow together completely prior to polymerization. The addition of a surface-active agent eliminates this problem and produces a smooth, attractive finish on highly reinforced compositions. If a smooth finish is not a necessary feature for certain applications, then a decrease in viscosity permits incorporation of larger amounts of filler materials into the monomer feed. Anionic, cationic, or nonionic surface active agents can be used to reduce the slurry viscosity; materials such as zinc stearate, long chain alkyl trimethylammonium halides, and alkylene oxide condensates of long carbon chain compounds have been used successfully.

The compositions of this invention can be modified by the inclusion of another component in the filler-polyalkyl methacrylate mixtures. The additional component is a difunctional compound containing at least one hydrolyzable functional group capable of reacting with hydroxyl groups and at least one functional group capable of reacting with a polyalkyl methacrylate. Reaction can occur through interpolymerization of the functional group with a polymerizing monomer, through transfer of the functional group with a segment of a polymer chain, or through some other mechanism. The difunctional compound is referred to as a coupling agent because of the bond it creates between the polymer and inorganic.

The filler and coupler are joined by combining them in the absence or presence of water, alcohol, dioxane, etc. Presumably the hydrolyzable group of the coupler reacts with the hydrogen atoms of appended hydroxyl groups attached to the surface of inorganic fillers. Theoretically, hydroxyl groups are present on the surface of, or can be developed upon the surface of, most metallic and siliceous substances, thereby providing a site available for reaction with a polar hydrolyzable group. Whatever the reaction mechanism, the reaction between inorganic and coupler can be carried out separately, and the dried filler-coupler adduct subsequently added to the monomer, or the reaction can be carried out in the presence of the monomer and the whole mixture dried to remove volatile reaction products and solvent, if used. Preferably, heat is applied to a coupler-filler mixture to increase the extent of bonding.

Preferred silane coupling agents are characterized by the formula

where Z is a radical interpolymerizable with a methacrylate monomer or reactive with a polyalkyl methacrylate polymer, examples being vinyl, allyl, acryloxy, methacryloxy and other radicals containing ethylenic unsaturation, Y is hydrogen or a monovalent hydrocarbon group, preferably having up to about 18 carbon atoms, examples being methyl, ethyl, propyl, phenyl, toluyl, naphthyl, vinyl, allyl and the like, X is a radical capable of reacting with a hydroxyl group, examples being halogen, alkoxy, cycloalkoxy, aryloxy, alkoxycarbonyl, aryloxycarbonyl, alkyl carboxylate, aryl carboxylate, and hydroxyl radicals, R is a divalent hydrocarbon group, examples being ethylene, propylene, undecyclene, undecenylene, phenylene, xylylene and the like, $n$ is 0 or 1, $a$ is an integer from 1 to 3, $b$ is an integer from 0 to 2, $c$ is an integer from 1 to 3, and the sum of $a+b+c$ equals 4. Particularly preferred are coupling agents of the above formula where R is an alkylene group having from about 2 to about 18 carbon atoms, the integer $a$ is 3, $b$ is 0, and $c$ is 1, where X is an alkoxy radical, and Z is a methacryloxy group, e.g.

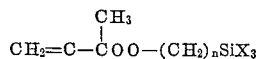

The function of the Z group and X group have already been discussed. The alkylene group in the formula above, $-(CH_2)_n-$, serves as a bridge between the polymer-reactive group and the silane group of a coupler. The alkylene bridge is usually present in a coupling agent because of the additional stability it contributes to the coupling agent. The Y group can be any hydrocarbyl group; the function of the Y group can be to modify the extent of the polymer-inorganic bond, to regulate viscosity of the monomer slurry, or it need not serve any function at all in the polymeric composition. Its presence may be due to a necessity or desirability to use a hydrocarbyl-substituted silane reactant in the synthesis of a silane coupler. Examples of suggested couplers include vinyl triethoxysilane, vinyl methyldichlorosilane, di-(3-methacryloxypropyl) dipropoxysilane, and 6-acryloxyhexyl tricyclohexoxysilane.

In addition to silicon-based couplers, phosphorus-based couplers comprise another class of suitable couplers. These compounds, containing functional groups corresponding to the X, Y and Z groups of the above formula, are adequately exemplified in U.S. 3,344,107. Other compounds useful as coupling agents include the coordinated chromium complexes which contain at least one polymer-reactive radical and at least one inorganic-reactive radical corresponding to the Z and X groups of the formula above. Examples include methacryloxychromic chloride, acryloxy chromic chloride, crotonyloxy chromic chloride, sorbyloxy chromic chloride, 3,4-epoxybutylchromic chloride, and methacryloxy chromic hydroxide.

The amount of coupler with which the filler can be treated is relatively small. As little as one gram of coupling agent per 1000 grams of reinforcing agent produces a polymeric composition with physical properties vastly superior to those of a polymeric composition containing an untreated filler. Generally, quantities of coupler in the range of 2.0 to 50 grams, preferably about 10 to 40 grams, per 1000 grams of filler have been found most satisfactory although quantities in excess of that range may also be used with little or no detriment to the properties of the finished product.

As catalyst for inducing the polymerization reaction, there may be used any compounds which will generate free radicals under the reaction conditions, although the peroxy compounds are preferred. Specific classes of compounds which can be used include perioxides such as diacetyl peroxide, acetyl benzoyl peroxide, dipropionyl peroxide, dilauroyl peroxide, benzoyl peroxide, 2,4-dichlorobenzoyl peroxide, dimethyl peroxide, diethyl peroxide, dipropyl peroxide, tetralin peroxide, cyclohexane peroxide, acetone peroxide; hydroperoxides such as cyclohexyl hydroperoxide, cumene hydroperoxide, t-butyl hydroperoxide, methyl cyclohexyl hydroperoxide; hydrazine derivatives such as hydrazine hydrochloride, hydrazine sulfate, dibenzoylhydrazine, diacetylhydrazine, trimethylhydrazinium iodide; amine oxides, such as pyridine oxide, trimethylamine oxide, dimethylaniline oxide; alkali metal and ammonium persulfates, perborates, and percarbonates; compounds containing the group $>C=N-$ and derived from ketaldones, i.e. a ketone or aldehyde, such as the azines (containing the group $>C=N-N=C<$) e.g. benzalazine, heptaldezine and diphenylketazine; oximes (containing the group $>C=NOH$) such as d-camphor oxime, acetone oxime, alpha-benzil dioxime, butyraldoxime, alpha-benzoin oxime, dimethylglyoxime; hydrazones (containing the group $>C=N-N<$) such as benzaldehyde phenylhydrazone, phenylhydrazones of cyclohexanone, cyclopentanone, acetophenone, methone, camphor, and benzophenone; semicarbazones (containing the group $>C=N-NHCONH_2$) such as semicarbazones of acetone, methyl ethyl ketone, diethyl ketone biacetyl, cyclopentanone, cyclohexanone, acetophenone, propionphenone, camphor and benzophenone; Schiff's bases (containing the group $>C=N-$) such as benzalaniline, benzal-p-toluidine, benzal-o-toluidine, benzaldehyde derivatives of methylamine, ethylamine, and heptylamine, anils and analogous compounds of other amines, such as acetaldehyde anil, isobutyraldehyde anil, heptaldehyde anil, etc.; oxygen, and reaction products of organometallics such as cadmium alkyls, zinc alkyls, tetraethyl lead, aluminum alkyls, etc. with oxygen.

The catalysts are generally used in amounts from about 0.001% to 0.5% by weight based on the total reactants. Although not necessary for attaining extremely high rates of reaction or for other special purposes, even higher amounts of catalyst may be used; for example, amounts ranging up to as high as 1% or even 5% as an upper limit can be employed.

The reinforced polymeric compositions of this invention can be prepared by a rapid casting technique. By this procedure a fluid mixture containing monomer, reinforcing agent, coupling agent and catalyst is charged to a mold, and a shaped solid product removed from the mold within a short time. The catalyst system can be chosen to provide a rapid polymerization reaction without the risks of a runaway type reaction. In an unfilled, unreinforced system, heating methyl methacrylate to 50 or 60° C. in the presence of a rapid catalyst system would produce a polymerized casting full of bubbles, thus preventing the use of a short polymerization time to prepare a rubber-methyl methacrylate polyblend. In the presence of a large quantity of filler acting as a heat sink to absorb the exothermic heat of polymerization, however, the polymerization can be made to proceed smoothly and quickly to completion, providing a bubble-free reinforced methyl methacrylate-rubber polyblend. The system is adaptable to a rapid, controlled polymerization to produce complex shapes at moderate temperatures and atmospheric pressure. Other processing techniques applicable to the reinforced compositions of this invention include compression molding, transfer molding, rotational molding, injection molding and centrifugal casting.

Broadly, the surface coverings of the present invention can be prepared by combining the specified proportions of filler and alkyl methacrylate polymer in a variety of ways. For instance, the polymer and inorganic can be combined by mill rolling followed by compression or injection molding or extrusion. Or the essential components can be combined by forming a mat or bed of filler, pouring a catalyzed methacrylate monomer slurry onto the filler, and polymerizing the monomer under heat and pressure. In a preferred aspect, the surface coverings can be prepared by reacting a coupler with a filler to form a coupler-filler adduct, and then conducting a polymerization of an alkyl methacrylate in the presence of the adduct and in the presence of a rubbery polymer so that the adduct is securely bound to, and the rubbery polymer is intimately dispersed throughout, the resultant polyalkyl methacrylate. The coupler can be prereacted with the filler prior to addition of the methacrylate monomer (as amply described in many of the subsequent examples) or it can be reacted with the filler using the alkyl methacrylate as a dispersing solvent. Substantial coupler-filler reaction is aided by application of heat in the range of 90 to 100° C. When the alkyl methacrylate monomer is used as a dispersing solvent, a satisfactory technique for achieving good coupler-filler reaction comprises adding the coupler to the monomer, adding the filler to the mixture, stirring, heating to 100° C., cooling down to 25° C., adding catalyst, and casting into a mold which may or may not be heated, depending upon the catalyst used.

$A_2$—3 phr. rubber and 73% inorganic by weight (54% by volume) in the total composition Crosslinking or non-crosslinking rubber
 $B_1$—saturated, non-crosslinking rubber (4021 Hycar)
 $B_2$—unsaturated, crosslinking rubber (1053 Hycar)

Comonomer content
 $C_1$—40% lauryl methacrylate
 $C_2$—20% lauryl methacrylate
 $C_3$—0% lauryl methacrylate Coupler content
 $D_1$—0.25% on filler
 $D_2$—none.

The series of factorial experiments is reported in Table I. The factorial is complete with respect to variables A, B and C and partial with respect to variable D.

TABLE I.—FLOOR TILE PROPERTY FACTORIAL EXPERIMENT

| Variable A Level | $A_1$ | | | | | | | | $A_2$ | | | | | | | |
|---|---|---|---|---|---|---|---|---|---|---|---|---|---|---|---|---|
| Variable B Level | $B_1$ | | | | $B_2$ | | | | $B_1$ | | | | $B_2$ | | | |
| Variable C Level | $C_1$ | $C_2$ | | $C_3$ | $C_1$ | $C_2$ | $C_3$ | | $C_1$ | $C_2$ | $C_3$ | | $C_1$ | $C_2$ | $C_3$ | |
| Variable D Level | $D_1$ | $D_1$ | $D_2$ | $D_1$ | $D_1$ | $D_1$ | $D_2$ | $D_2$ | $D_1$ | $D_1$ | $D_1$ | $D_2$ | $D_1$ | $D_2$ | $D_1$ | $D_1$ |
| Abrasion resistance [1], cycles/inches | 16,125 | 33,950 | 26,475 | 43,900 | 22,525 | 43,400 | 65,125 | 36,550 | 24,825 | 50,525 | 76,800 | 48,675 | 29,900 | 26,125 | 34,400 | 47,700 |
| Heat distortion [2], temperature ° C | 42 | 68 | 63 | 100 | 40 | 62 | 97 | 97 | 44 | 67 | 100 | 101 | 42 | 40 | 67 | 98 |
| Indentation resist.[3]: | | | | | | | | | | | | | | | | |
| Percent penetration | 5.33 | 3.63 | 10.93 | 4.30 | 6.68 | 3.13 | 3.09 | 4.72 | 7.77 | 3.24 | 4.72 | 3.64 | 10.76 | 6.45 | 5.33 | 4.24 |
| Percent residual | 0.35 | 0.00 | 0.00 | 0.00 | 1.00 | 0.00 | 0.00 | 0.00 | 0.34 | 0.00 | 0.00 | 0.00 | 0.69 | 0.80 | 0.00 | 0.00 |
| Stain resistance [4]: | | | | | | | | | | | | | | | | |
| Red rit dye | 5 | 1 | 1 | 1 | 3 | 1 | 1 | 1 | 1 | 1 | 1 | 1 | 1 | 3 | 1 | 1 |
| Heel marks | 3 | 3 | 2 | 3 | 3 | 3 | 3 | 3 | 3 | 3 | 1 | 3 | 5 | 3 | 5 | 1 |
| Washable fountain pen ink | 1 | 1 | 1 | 1 | 1 | 1 | 1 | 9 | 1 | 1 | 1 | 9 | 1 | 1 | 1 | 1 |
| Cigarette burns | 9 | 9 | 9 | 7 | 9 | 9 | 8 | 9 | 9 | 9 | 5 | 7 | 9 | 9 | 9 | 8 |
| Dirty cutting oil | 1 | 1 | 1 | 1 | 9 | 1 | 1 | 1 | 1 | 1 | 1 | 1 | 1 | 9 | 1 | 1 |
| Density, g./c.c. | 1.90 | 1.93 | 1.92 | 1.97 | 1.88 | 1.93 | 1.98 | 1.98 | 1.98 | 2.02 | 2.04 | 2.05 | 2.00 | 2.01 | 2.03 | 2.05 |
| Liberty mutual slipometer test [5] | 68 | 60 | 56 | 62 | 90 | 55 | 73 | 66 | 65 | 64 | 56 | 63 | 72 | 68 | 62 | 59 |

[1] ASTM 1242 Method B with grams loss converted to cycles/in.
[2] ASTM D648.
[3] Percent penetration after 10 minutes, 140 lbs. load on indenter of 0.203" diameter.
[4] Stain resistance rating according to removal technique required to restore satisfactory finish and extent of staining, if any, e.g., (1) Tide and Water; (2) Mr. Clean; (3) Fiberglass conditioner; (4) Hexane; (5) Ajax; (6) Clorox; (7) Very light residual stain; (8) Light residual stain; (9) Residual stain.
[5] Greater than 50 considered acceptable for public building by Liberty Mutual Insurance Co. The tester is a development of Liberty Mutual. Values given are without application of any wax.

The following examples more specifically illustrate some of the preferred compositions, methods for their preparation and their uses as surface coverings. Quantities of material are reported in parts by weight.

EXAMPLES 1 to 16

To 1000 parts of 2:1 mixture of mullite:wollastonite is added 2.5 parts of 3-trimethoxysilypropyl methacrylate dissolved in 500 parts of methanol. The slurry is mixed, placed in a hood to evaporate methanol, and the dried mineral mixture heated at 210° C. for one hour. The mineral is cooled and milled in a ball mill to break up aggregates.

To 300 parts of methyl methacrylate or a monomer mix consisting of methyl methacrylate and lauryl methacrylate is added a quantity of a rubbery polymer. To the thoroughly mixed slurry is added a quantity of a 2:1 mullite: wollastonite mixture which can be pretreated as described above. The resultant slurry is heated to 85° C., after which time 2.1 parts of cumene hydroperoxide and 5.4 parts of 2,5-dihydrothiophene-1, 1-dioxide is added. The slurry is poured into a ¼ inch thick sheet mold preheated to 90° C. The mold temperature is maintained at 90° C. for 20 minutes, after which time the mold is opened to expose a smooth, solid polymerized article.

Variables of filler content, rubbery polymer type and content, lauryl methacrylate content, and coupler content are varied in a series of factorial experiments. The five variables in the polymerization recipe are designated as follows:

Technique of obtaining pourable slurry
 $A_1$—7 phr. rubber and 70% inorganic by weight (50% by volume) in the total composition Resistance to staining is considered good if the five stain ratings total 25 or less. Resistance to staining is considered excellent if the five stain ratings total 20 or less. Good slip resistance is characterized by a Slipometer value of 50 or greater. As reported in Table II, cement terrazzo has an abrasion resistance value of about 14,000 cycles per inch which is considered good for the compositions of this invention. Particularly preferred are those compositions with an abrasion resistance of 25,000 cycles per inch or greater. Residual indentation is satisfactory for a terrazzo-like flooring if it is less than 1% of the original thickness of the floor covering. A satisfactory heat distortion temperature is 40° C. or above and preferably 65° C. or above. For installations subjected to extremes of high temperature, a heat distortion temperature of 95° C. or above may be required and can be provided by the compositions described herein.

Inspection of Table I reveals that the floor coverings encompassed by the present invention can be formulated to encompass a wide variety of specifications. For instance, formulation $A_2B_2C_1D_1$ provides a covering having more than twice the abrasion resistance of cement terrazzo, a fair resilience, excellent stain resistance, good slip resistance, but with some sacrifice in heat distortion. Formulations $A_1B_1C_3D_1$ and $A_2B_1C_3D_1$ on the other hand have excellent abrasion resistance, excellent stain resistance, complete indentation recovery and a much higher heat distortion temperature. Further, the formulations of this invention can be additionally modified by variation of inorganic type and content and other variables to provide coverings suitable for several different applications.

Table II is provided to demonstrate the values of the floor coverings of this invention in comparison to other commercially available flooring surfaces.

TABLE II.—COMPARISON OF INITIAL TILE FORMULATION WITH COMMERCIAL MATERIALS

| Indentation: | A₂, B₁, C₃, D₁ initial tile formulation | Cement terrazzo | Epoxy terrazzo | Vinyl | Vinys asbestol |
|---|---|---|---|---|---|
| Percent penetration | 4.72 | | 1.1 | 31.4 | 14.6 |
| Percent residual indentation | 0 | 0 | .05 | 5.20 | 3.92 |
| Stain resistance [1]: | | | | | |
| Red dye | 1 | 1 | 6 | 6 | 6 |
| Fountain pen ink | 1 | 3 | 9 | 5 | 8 |
| Heel marks | 1 | | | | |
| Cigarette burn | 5 | 3 | 5 | 9 | 8 |
| Dirty cutting oil | 1 | 1 | 2 | 1 | 8 |
| Abrasion resistance: | | | | | |
| Wear rate cycles/inch ASTM D1242, Method B | 76,800 | 14,300 | | 10,700 | 8,300 |
| Ball drop impact [2] | 2 | | 1 | 4 | 3-4 |
| Slipometer test [3] | 55 | 60 | 61 | 62 | 61 |

[1] For explanation of stain resistance values, see footnote 4 of Table I.
[2] Number indicates the number of drops of 2-lb steel ball from 8 ft. height required to produce crack to edge or complete break in non-adherent tile on concrete backing, as point of impact was moved from the center for the first drop, to ½ distance to corner for the second drop, to ¾ distance to corner for the third drop. 4 indicates no failure.
[3] For explanation of Slipometer values, see footnote 5 of Table I.

The preceding examples demonstrate the utility of the inventive compositions as floor coverings. This specific utility was chosen for exhaustive testing because of the vigorous demands which must be satisfied before a material can expect to compete with other products as a flooring material. Upon recognition of the materials' physical and mechanical properties, those skilled in the art will also recognize the value of our compositions as exterior and interior wall surface coverings and as several other articles which can benefit from good resistance to staining, heat, abrasion, indentation and impact. For instance, the materials can be fabricated into structures such as room dividers which are not laminates of reinforced methacrylate over a substrate but rather are sheets of the reinforced polymer attached to a skeletal framework or are integrally molded articles. Accordingly, these and other modifications are contemplated within the spirit of the described invention.

What is claimed is:

1. An architectural surface composite comprising an architectural surface and a preformed resinous covering composition adhered thereto, said composition comprising
   (a) from about 10 to about 95% by volume based on the total composition of an inorganic filler having a Moh's hardness of at least about 4, said filler having been treated with an organosilane coupling agent of the formula $$X_a-\underset{\underset{Y_b}{|}}{Si}-(R_n-Z)_c$$

where X is a group of reacting with a hydroxyl group, Y is hydrogen or a monovalent hydrocarbon group, Z is a group interpolymerizable with a methacrylate monomer or reactive with a polyalkylmethacrylate polymer, R is a divalent hydrocarbon group, $n$ is 0 to 1, $a$ is 1 to 3, $b$ is 0 to 2, $c$ is 1 to 3, provided that the sum of $a+b+c$ equals 4, and
   (b) from about 90 to about 5% by volume based on the total composition of a polyalkylmethacrylate.

2. An architectural surface composite according to claim 1 wherein said architectural surface is a floor.

3. An architectural surface composite according to claim 1 wherein said architectural surface is a wall.

4. An architectural surface composite according to claim 1 wherein said inorganic filler has a maximum water solubility of about 0.25 gram per liter.

5. An architectural surface composite according to claim 1 wherein said inorganic filler has a maximum water solubility of about 0.15 gram per liter, a melting point above about 800° C. and a 3-dimensional crystal structure.

6. An architectural surface composite according to claim 1 wherein said filler is present in an amount from about 25 to about 75% by volume of the total composition and said polyalkylmethacrylate is present in an amount from about 75 to about 25% by volume of the total composition.

7. An architectural surface composite according to claim 1 wherein the polymeric matrix of said composition contains a rubbery polymer in addition to the polyalkylmethacrylate.

8. An architectural surface composite according to claim 7 wherein said rubbery polymer is present in an amount from about 1 up to about 20% by weight of the polyalkylmethacrylate matrix.

9. An architectural surface composite according to claim 7 wherein said rubbery polymer is present in an amount from about 1 up to about 10% by weight of the polyalkylmethacrylate matrix.

10. An architectural surface composite according to claim 1 wherein the polymeric matrix of said composition contains a crosslinking agent in addition to the polyalkylmethacrylate matrix.

11. An architectural surface composite according to claim 10 wherein said crosslinking agent is a compound having more than one acrylate or methacrylate group.

12. An architectural surface composite according to claim 1 wherein said polyalkylmethacrylate is a polymethylmethacrylate homopolymer.

13. An architectural surface composite according to claim 1 wherein the polymeric matrix of said preformed resinous covering composition contains from about 5 to about 40% by weight polyvinylchloride and from about 95 to about 60% by weight polyalkymethacrylate.

14. A flooring composite comprising a floor and a preformed resinous covering composition adhered to said floor, said composition comprising
   (a) from about 25 to about 75% by volume of the total composition of an inorganic filler having a maximum length to diameter ratio of 25 to 1, a Mohs hardness of at least 4, a maximum water solubility of about 0.25 gram per liter, a melting point above about 800° C., and a 3-dimensional crystal structure, said filler having been treated with an organosilane coupling agent of the formula

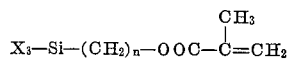

where X is an alkoxy group having up to about 6 carbon atoms and $n$ is an integer from about 2 to about 18,
   (b) from about 75 to about 25% by volume of the total composition of a polymeric matrix containing from about 5 to about 40% by weight polyvinylchloride and from about 95 to about 60% by weight polyalkylmethacrylate, and
   (c) a crosslinking agent having more than one acrylate or methacrylate group.

15. A process for covering an architectural surface comprising adhering to said surface a preformed resinous covering composition comprising (a) from about 10 to about 95% by volume based on the total composition of an inorganic filler having a Moh's hardness of at least about 4, said filler having been treated with an organosilane coupling agent of the formula

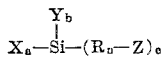

where X is a group capable of reacting with a hydroxyl group, Y is hydrogen or a monovalent hydrocarbon group, Z is a group interpolymerizable with a methacrylate monomer or reactive with a polyalkylmethacrylate polymer, R is a divalent hydrocarbon group, $n$ is 0 to 1, $a$ is 1 to 3, $b$ is 0 to 2, $c$ is 1 to 3, provided that the sum of $a+b+c$ equals 4, and (b) from about 90 to about 5% by volume based on the total composition of a polyalkylmethacrylate.

16. A process according to claim 15 wherein said architectural surface is a floor.

17. A process according to claim 15 wherein said architectural surface is a wall.

18. A process according to claim 15 wherein said inorganic filler has a maximum water solubility of about 0.25 gram per liter.

19. A process according to claim 15 wherein said inorganic filler has a maximum water solubility of about 0.15 gram per liter, a melting point above about 800° C. and a 3-dimensional crystal structure.

20. A process according to claim 15 wherein said filler is present in an amount from about 25 to about 75% by volume of the total composition and said polyalkylmethacrylate is present in an amount from about 75 to about 25% by volume of the total composition.

21. A process according to claim 15 wherein the polymeric matrix of said composition contains a rubbery polymer in addition to the polyalkylmethacrylate.

22. A process according to claim 21 wherein said rubbery polymer is present in an amount from about 1 up to about 20% by weight of the polyalkylmethacrylate matrix.

23. A process according to claim 21 wherein said rubbery polymer is present in an amount from about 1 up to about 10% by weight of the polyalkylmethacrylate matrix.

24. A process according to claim 15 wherein the polymeric matrix of said composition contains a crosslinking agent in addition to the polyalkylmethacrylate matrix.

25. A process according to claim 24 wherein said crosslinking agent is a compound having more than one acrylate or methacrylate group.

26. A process according to claim 15 wherein said polyalkyl methacrylate is a polymethylmethacrylate homopolymer.

27. A process according to claim 15 wherein the polymeric matrix of said preformed resinous covering composition contains from about 5 to about 40% by weight polyvinylchloride and from about 95 to about 60% by weight polyalkylmethacrylate.

28. A process for covering a floor comprising adhering to said floor a preformed resinous floor covering composition comprising (a) from about 25 to about 75% by volume of the total composition of an inorganic filler having a maximum length to diameter ratio of 25 to 1, a Mohs hardness of at least 4, a maximum water solubility of about 0.25 gram per liter, a melting point above about 800° C., and a 3-dimensional crystal structure, said filler having been treated with an organosilane coupling agent of the formula

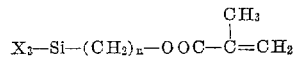

where X is an alkoxy group having up to about 6 carbon atoms and $n$ is an integer from about 2 to about 18, (b) from about 75 to about 25% by volume of the total composition of a polymeric matrix containing from about 5 to about 40% by weight polyvinylchloride and from about 95 to about 60% by weight polyalkylmethacrylate, and (c) a crosslinking agent having more than one acrylate or methacrylate group.

References Cited

UNITED STATES PATENTS

| | | | |
|---|---|---|---|
| 2,611,958 | 9/1952 | Semmelman et al. | 260—861X |
| 2,643,983 | 6/1953 | Dangelmajer | 260—861X |
| 2,670,483 | 3/1954 | Brophy | 260—861X |
| 2,705,836 | 4/1955 | Watson | 260—861X |
| 2,750,320 | 6/1956 | Latham | 260—861X |
| 2,796,411 | 6/1957 | Zirkle et al. | 260—41 |
| 2,934,512 | 4/1960 | Godshalk | 260—41A |
| 3,078,249 | 2/1963 | Russell | 260—860 XR |
| 3,079,361 | 2/1963 | Plueddeman | 260—37 |
| 3,324,074 | 6/1967 | McManimie | 260—41 |
| 3,324,089 | 6/1967 | Trepka | 260—89.5XR |
| 3,344,011 | 9/1967 | Goozner | 161—162XR |
| 3,405,088 | 10/1968 | Slocum | 260—41A |
| 3,421,968 | 1/1969 | Preaux et al. | 161—162XR |
| 3,423,828 | 1/1969 | Halpern et al. | 161—162XR |
| 3,442,851 | 5/1969 | McManimie | 260—41A |

OTHER REFERENCES

Modern Plastics Encyclopedia, 1965, vol. 42, No. 1A, September 1964, pp. 125, 126 and 576.

JOHN T. GOOLKASIAN, Primary Examiner

G. W. MOXON II, Assistant Examiner

U.S. Cl. X.R.

161—168, 208; 260—41

PO-1050
(5/69)

UNITED STATES PATENT OFFICE
CERTIFICATE OF CORRECTION

Patent No. 3,575,785                                    Dated April 20, 1971

Inventor(s) Robert J. McManimie and Ross M. Hedrick

It is certified that error appears in the above-identified patent and that said Letters Patent are hereby corrected as shown below:

IN THE SPECIFICATION:

Column 8, line 21, "a finished composition a high filler" should read --- a finished composition with a high filler ---.
See specification page 12, line 19.

Table I (Columns 11 and 12), line 4 of Table headings (Variable D Level), 7th "D" from the left should read --- $D_1$ --- instead of "$D_2$".
See specification page 19.

Table II (Column 13), in Table headings "Indentation:" should be below the line underscoring the headings.

Table II (Column 13), in Table headings "Vinys asbestol" should read --- Vinyl asbestos ---.

IN THE CLAIMS:

Claim 1, first line after the formula, "where X is a group of reacting" should read --- where X is a group capable of reacting ---.

Signed and sealed this 12th day of December 1972.

(SEAL)
Attest:

EDWARD M. FLETCHER, JR.                    ROBERT GOTTSCHALK
Attesting Officer                          Commissioner of Pat